(No Model.)　　　　　　　　　　　　　　　　　2 Sheets—Sheet 1.

W. TUNSTILL.
MACHINE FOR WORKING BUTTER.

No. 247,859.　　　　　　　　　　　　Patented Oct. 4, 1881.

Witnesses  
Chas. H. Smith  
J. Haile

Inventor  
William Tunstill  
per Lemuel W. Serrell  
Atty.

(No Model.)  2 Sheets—Sheet 2.

W. TUNSTILL.
MACHINE FOR WORKING BUTTER.

No. 247,859.  Patented Oct. 4, 1881.

Witnesses
Chas. H. Smith
J. Haily

Inventor
William Tunstill
per Lemuel W. Serrell
atty

UNITED STATES PATENT OFFICE.

WILLIAM TUNSTILL, OF NEW YORK, ASSIGNOR TO HIMSELF, H. K. THURBER, OF SAME PLACE, AND JOHN D. PECK, OF BROOKLYN, N. Y.

MACHINE FOR WORKING BUTTER.

SPECIFICATION forming part of Letters Patent No. 247,859, dated October 4, 1881.

Application filed November 8, 1880. (No model.)

*To all whom it may concern:*

Be it known that I, WILLIAM TUNSTILL, of the city and State of New York, have invented an Improvement in Machines for Working Butter, Oleomargarine, &c., of which the following is a specification.

Efforts have heretofore been made to remove from the oleomargarine the watery portions by a reciprocating follower and a sieve through which the material is passed after the refrigerating operation; but there is considerable waste of material, and the apparatus is difficult to keep clean and requires two or three persons to operate the same. In the presses and butter-workers that have before been made wood is usually employed, because the buttermilk acts rapidly upon metal, and the butter is discolored and the apparatus cannot be kept clean. Besides this the wood swells, shrinks, cracks, or becomes inoperative, according to the moist or dry condition thereof.

I make use of a metal receptacle having a feeding-chute at one side and a grating in the bottom, and within this receptacle is a hollow plunger, moved up and down by two cranks, acting through links upon side levers that are connected by links to a cross-bar above the plunger so as to move the plunger equally at both ends and render the actuating mechanism compact. The receptacle, grating, and plunger are all made of galvanized iron, so as to prevent the buttermilk from injuring the same and the butter from becoming discolored. The galvanizing also fills up the pores of the iron and prevents any butter remaining in the apparatus to become rancid after the said apparatus has been washed with hot water.

This butter-worker is adapted to the reception of the oleomargarine or similar material, the same being shoveled into the receptacle and pressed by the plunger through the grating each reciprocation thereof. The grating separates the butter into filaments and prevents the existence of lumps or inequalities. At the same time the watery portions are liberated from the cells, so that they run freely away and leave the butter in a light spongy condition adapted to the salting and packing operations.

Figure 1:
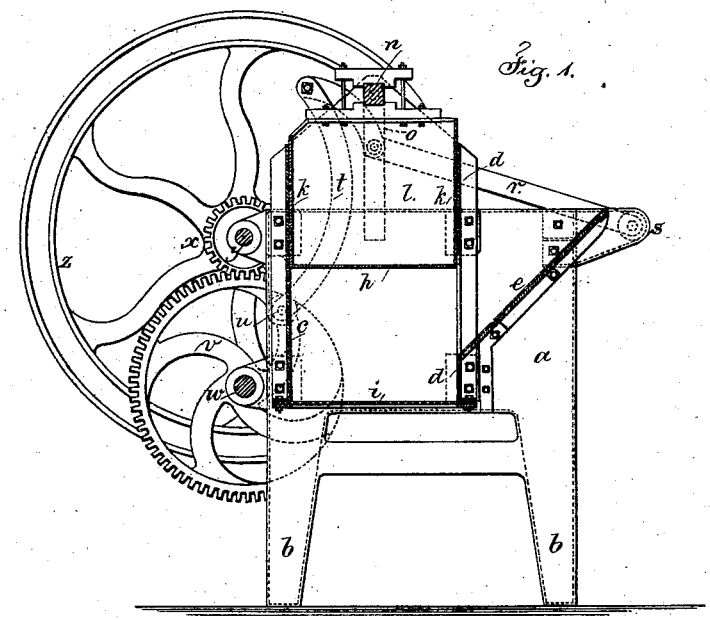
Figure 2:
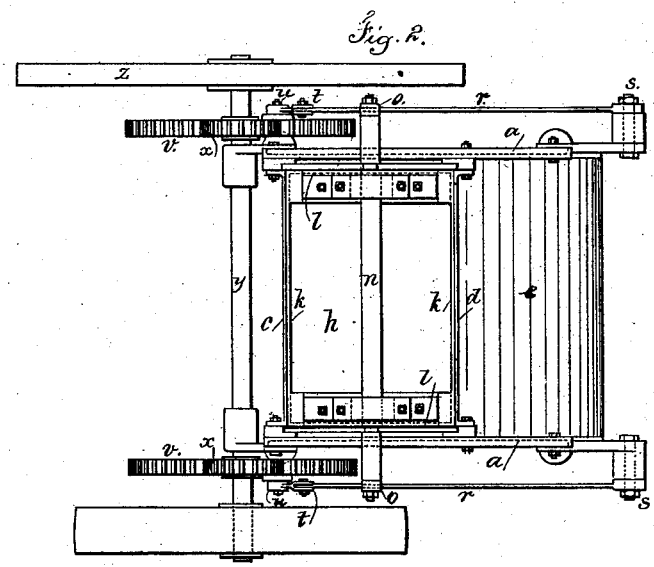
Figure 3:
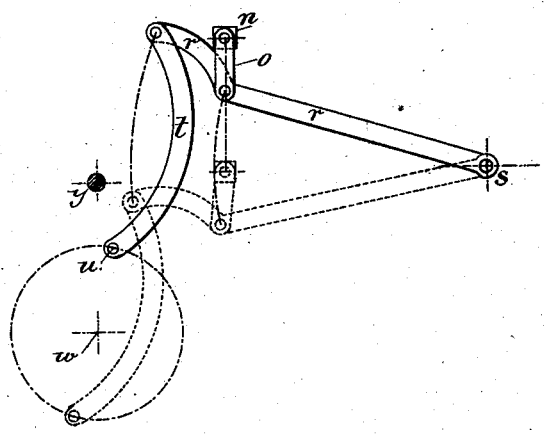

In the drawings, Figure 1 is a vertical section of the machine complete. Fig. 2 is a plan of the same; and Fig. 3 is a diagram of the cranks, connections, and levers that move the plunger.

The side frames, $a\ a$, are of cast-iron, with legs $b\ b$, and between these frames are the plates $c\ d$, that are vertical, and the plate $e$, which is at an inclination; the parts being bolted together, and there is an opening through the plate $d$, and the lower edge of the inclined plate $e$ coincides with the edge of the plate $d$ at the bottom of the opening, so that this plate $e$ and the frames $a\ a$ form a feeding-hopper at one side of the vertical box or receptacle composed of the plates $a\ a$, $c$, and $d$. These parts are all galvanized upon their surfaces, so as to be protected from rust by the zinc surface. At the bottom of the receptacle thus formed is a perforated plate or grating, $i$, formed, by preference, of strong wire-netting with small meshes, and the edges are held between two open frames that are secured together and galvanized as a whole, so that the crevices will be filled with the zinc and prevent the lodgment of the butter or similar material. This grating and its surrounding frame is bolted to the flanges at the lower edge of the plates $c\ d$ and upon the surfaces of the plates $a\ a$.

The plunger is formed of a metal box having bottom $h$, sides $k$, and ends $l$. The entire surfaces of this plunger are galvanized, and it is preferable to make this plunger of one casting, and it is of a size to be moved freely up and down within the receptacle $a\ a\ c\ d$; but the parts fit sufficiently closely to prevent the butter squeezing upwardly between the surfaces of the plunger and the surrounding receptacle.

The plunger-box has across it a bar, $n$, the ends of which pass through slots in the frames $a\ a$, and are connected by links $o$ to the levers $r$, the pivots $s$ of which are upon the frames $a$, and at their moving ends there are links $t$ to the cranks $u$ upon the wheels $v$, that are secured to the cross-shaft $w$, and receive motion from the pinions $x$, shaft $y$, and fly-wheel $z$, to which the necessary power is applied. By this construction the power operates with but little friction to give a regular movement to the plunger up and down, and whenever the parts require to be cleaned they are easily separated and washed with hot water.

A receptacle for the filaments of butter issuing downwardly through the grating every time the plunger descends is to be placed beneath the machine, and there is to be a perforated bottom to such receptacle to allow the watery portions that are liberated from the butter to run away. When the plunger-box rises the butter or similar material is fed in beneath it from the inclined plate or hopper at $e$.

The levers, links, and cranks shown are preferred for giving motion to the plunger; but these parts may be varied, if desired.

I claim as my invention—

The combination, in an apparatus for working butter or similar material, of a galvanized-iron box, a galvanized-iron grating at the bottom, the inclined plate $e$, the galvanized-iron plunger within the box, the cross-bar $n$, links $o$, levers $r$, pivoted at $s$, the links $t$, cross-shaft $w$, and cranks $u$, acting upon each end of the cross-bar $n$, substantially as set forth.

Signed by me this 3d day of November, A. D. 1880.

WILLIAM TUNSTILL.

Witnesses:
GEO. T. PINCKNEY,
WILLIAM G. MOTT.